J. W. SULLINS.
GRAIN HEADER AND LOADER.
APPLICATION FILED JAN. 13, 1917.

1,286,444.

Patented Dec. 3, 1918.
2 SHEETS—SHEET 1.

WITNESSES
W. C. Fielding
Lloyd W. Patch

INVENTOR
John W. Sullins
BY Richard Owen.
ATTORNEY

J. W. SULLINS.
GRAIN HEADER AND LOADER.
APPLICATION FILED JAN. 13, 1917.
1,286,444.
Patented Dec. 3, 1918.
2 SHEETS—SHEET 2.
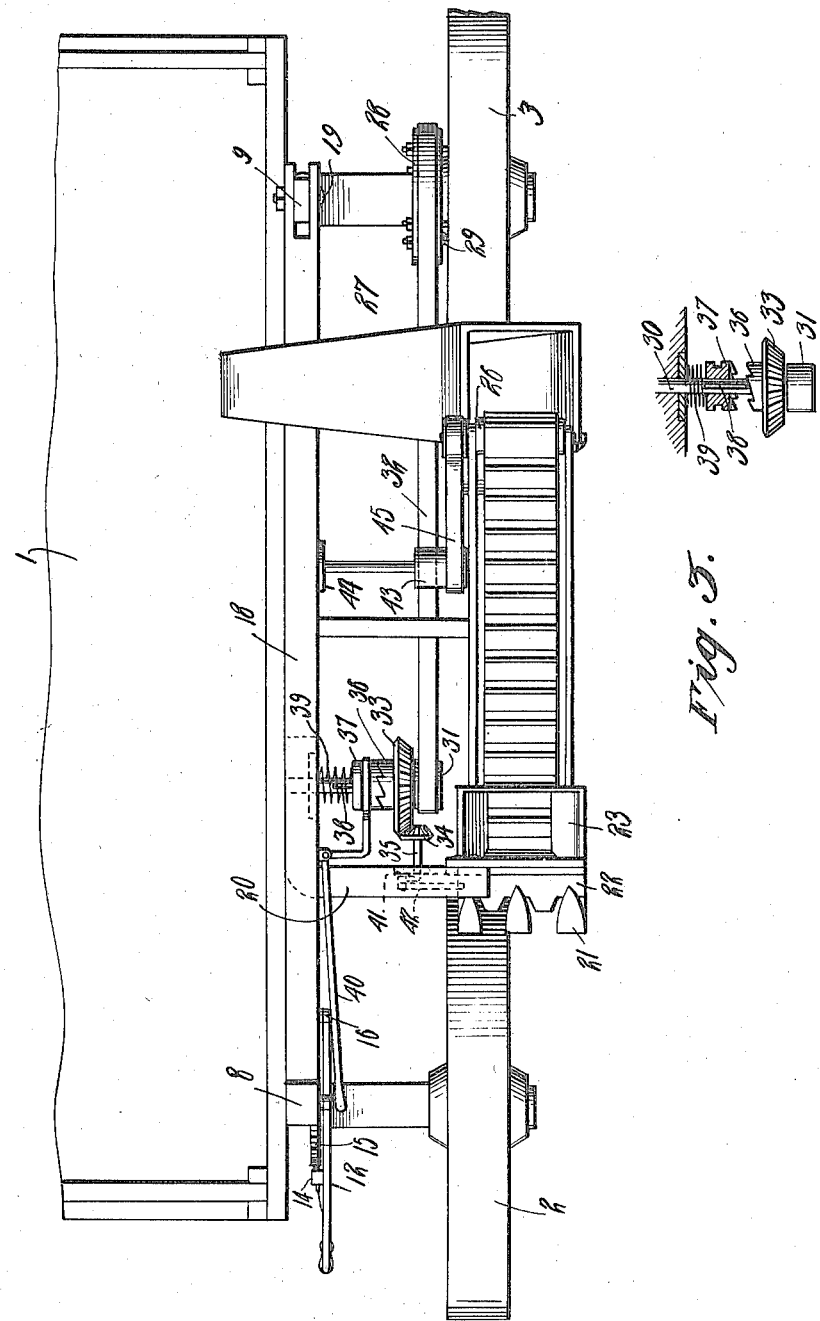
WITNESSES
W. C. Fielding
Lloyd W. Cater
INVENTOR
John W. Sullins
BY Richard Owen,
ATTORNEY

UNITED STATES PATENT OFFICE.

JOHN W. SULLINS, OF PARADISE, TEXAS.

GRAIN HEADER AND LOADER.

1,286,444.  Specification of Letters Patent.  Patented Dec. 3, 1918.

Application filed January 13, 1917. Serial No. 142,252.

*To all whom it may concern:*

Be it known that I, JOHN W. SULLINS, a citizen of the United States, residing at Paradise, in the county of Wise and State of Texas, have invented certain new and useful Improvements in Grain Headers and Loaders, of which the following is a specification.

This invention relates to an improvement in grain headers and loaders and more particularly to structure of this character designed to be fitted to an ordinary farm wagon, and operated by the movement of the same over a field to cut the heads or top the stalks and then load the tops into the wagon.

An object of my invention is to provide a device of the character described which can be fitted and secured upon the bed of the wagon or upon the bolster post, to thus be mounted in an operative relation and which presents a sickle or cutting bar to extend laterally from the wagon in such a manner that as the wagon is driven adjacent the rows of standing grain, the sickle or knives will top the stalks or cut the heads therefrom, a conveyer being provided at a point to receive the tops or heads and to convey the same to the wagon box.

The device of my invention is perhaps particularly adaptable for use in topping Kafir-corn, cane, and the like, it being understood that such grains are usually planted in rows, although the device of my invention is adapted for use where the stalks are the upgrowth of seed planted broadcast, and it is a further purpose of my invention to provide means by which the sickle or knives can be manually regulated as to height of disposition above the ground, thus making it possible for the operator to keep the knives at all times at the height to accomplish the most efficient action as the wagon is moved over the fields and the height of the stalks may be varying.

Yet another object is to provide means to be attached in conjunction with one of the wheels of the wagon and to impart operating movement to the knives and to the conveyer during the travel of the machine in an operative path, means also being provided to cut off the power connection to the knives, when desired.

With the above and other objects in view, my invention consists in certain novel features of construction and combination of parts which will be hereinafter set forth in connection with the drawings and then more particularly pointed out in the claims.

In the drawings:—

Fig. 2 is a plan view showing the parts of the attachment.

Fig. 3 is a detail view showing clutch-mechanism by which the device is thrown into and out of the operative relation.

Figure 1:
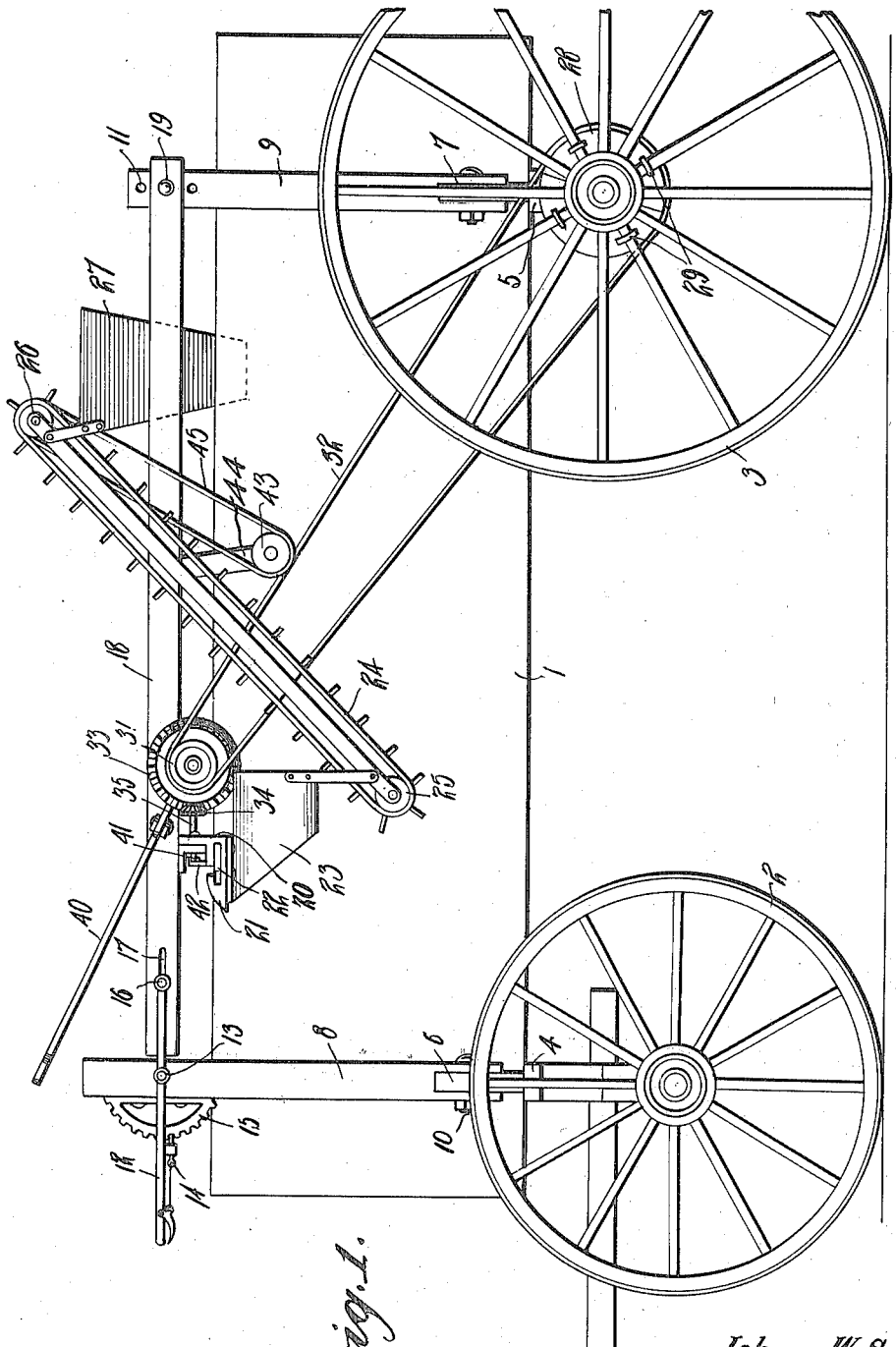
Figure 1 is a view in side elevation of a wagon showing the device of my invention applied thereon.

The wagon can be of any style and design, the box 1 being carried by the wheels 2 and 3 which are mounted on the axles of the running gear. The bolsters 4 and 5 have the bolster stakes 6 and 7 extending upwardly therefrom to hold the body or box in place, and thus it will be seen that the parts are of the usual form and arrangement.

The supporting members 8 and 9 are shaped to be received over the bolster stakes and secured thereto by means of the bolts 10, or these supports might be fastened directly to the wagon box or bed. The supporting member 9 has a plurality of openings 11 formed therethrough adjacent the upper end and in spaced relation, and the supporting member 8 has a hand lever 12 mounted thereon by means of the pivot pin or bolt 13 so that the latch 14 thereof will work within the teeth of the segmental rack 15. This hand lever 12 is extended beyond the point or pivot at 13, and a pin or bolt 16 carried by the end of the free arm thereof is received through a slotted opening 17 provided in one end of a cross supporting member 18. At its opposite end this member 18 is bifurcated to receive the upper end of the member 9, and a pin or bolt 19 is provided to be received through openings of the bifurcated end of member 18 and through the openings 11 of the member 9, the end of the bar 18 being thus adjustable to be set at its rear end and manually movable at its forward end through swinging of the hand lever 12, it being understood that the latch 14 engaging in the teeth of the rack 15 will hold manual adjustment made at the forward end of the bar 18.

A bracket member 20 is carried from the bar 18, and at its outer end this bracket bar has the knife guide 21 mounted, the knife 22 being slidably mounted within the knife guide after the manner of the usual sickle as provided upon mowing and reaping machines. Below the cutting knife 22, a hopper 23 is provided in which the heads of grain as severed from the stalk by the knife are dropped, and this trough has the lower end of the conveyer 24 supported thereby. The conveyer belt travels over the rollers 25 and 26, and as the heads or tops of the grain severed by the knife 22 and dropped within the hopper 23 are discharged upon the belt, the same will be carried upwardly and be dropped into a hopper 27 extended to have its discharge opening within the wagon box. This hopper 27 is carried by the cross member 18, and as the hopper 23 is supported by the bracket arm 20 carried from the bar 18 it will be seen that all of the parts are mounted to be supported by the cross bar and that when the adjustments of this bar are made all the parts will be correspondingly moved so that the operation of the mechanism will be continued and will be efficient at all times.

A split pulley 28 is shaped to be received around the hub of one of the rear wheels 3 on the inner side, and the hooks or U-bolts 29 are provided to be received around the spokes of the wheel and this to secure the same to turn with the wheel. A shaft 30 is journaled upon the cross bar 18 to be capable of revoluble movement, and at its outer end has a belt pulley 31 secure. A belt 32 is mounted over the split pulley 28 and the fixed pulley 31, and thus turning movement is imparted to the shaft 30 so that the same is constantly given during turning of the wheel 3. A beveled gear wheel 33 is loosely mounted on the shaft 30 adjacent the belt wheel 31, and is at all times in mesh with a beveled pinion 34 mounted on the shaft 35 carried in suitable bearings provided on the bracket arm 20. The beveled gear wheel 33 has one member of a clutch connection formed on the hub thereof, as is shown at 36, and a clutch member 37 is mounted slidably on the shaft 30 to be brought into engagement with the clutch portion 36 and is held against turning upon the shaft by the key or spline 38. This clutch member 37 is constantly rotated due to the fact that it is fixed against turning on the shaft 30, and a spring 39 is mounted around the shaft 30 to normally urge the clutch member 37 resiliently to the position of engagement and locking with the clutch portion 36. A hand lever 40 is provided to be operated to shift the clutch member 37 from the engaged position against the bearing pressure of the spring 39. The shaft 35 has a crank arm 41 provided thereon and a pitman rod 42 is connected with this crank arm and with the blade or knife 22 so that as the clutch 37 is locked with the clutch portion 36 and turning movement is imparted to the beveled gear wheel 33, the beveled pinion 34 and consequently the shaft 35 will be turned to impart reciprocatory movement to the knife 22 cause the same to operate in a cutting path in the guide 21. Movement of the lever 40 to release the clutch member 37 will of course stop the operative movement of the knife.

A friction belt pulley 43 is mounted on a shaft carried by the arm 44 depending from the bar 18, and this pulley 43 bears frictionally against the belt 32 on the upper side thereof to have turning movements thus imparted thereto. A belt 45 is led around pulley 43 and around a suitable pulley arranged to impart movement to the rollers 26, and thus as the wheel 3 turns and the belt 32 is consequently moved, the conveyer will be operated to have the top length thereof travel upwardly to carry the heads as discharged from the hopper 23 to be discharged into the hopper 27.

In the use of the device, the members 8 and 9 will be mounted upon the wagon structure in the manner as stated, or in any other suitable manner, the split pulley 28 is secured in conjunction with one of the wheels of the wagon, and the bar 18 is set at its rear end to be adjusted to the approximate average height of the stalks to be topped. The hand lever 40 is left free and the spring 39 will urge the clutch member 47 to a position that the beveled gear 33 is locked to turn with shaft 30. This turning of the beveled gear will impart the reciprocatory movement to the knife 32, and the bearing of the pulley 34 against the belt 32 will transmit the desired operating power to the conveyer. The wagon is then driven adjacent the row of stalks in a straight path through the field and the tops of the stalks will be cut off so that the head or top portions will fall into the hopper 23 from which the tops are discharged to the conveyer 24 and are carried to the hopper 27 to be discharged into the wagon. By manipulation of the hand lever 12, the relative heights of disposition of the knife can be varied and thus the machine will dispose the topping mechanism at a point to accomplish the proper operation. The operator can shift the hand lever 12 during the travel of the machine and can thus vary the disposition of the knife for proper operation upon low or tall stalks, even though at the outset the bar 18 has been adjusted and set for the use of the parts at the average or normal height of the stalks.

From the foregoing it will be seen that I have provided a grain heading and loading mechanism which is adaptable for attachment to an ordinary wagon to top the stalks of grain, catch the heads, and carry the same to be loaded into the wagon box, and while I have herein shown and described only one specific form of the device, it will be understood that a number of changes and modifications might be resorted to in the form and arrangement of the parts without departing from the spirit and scope of my invention, and hence I do not wish to be limited to the exact disclosure, but only to such points as may be set forth in the claims.

I claim:

1. In a grain header and loader adapted for use with a wagon comprising a body and forward and rear bolster stakes, a bar pivotally mounted on the upper end of one of said bolster stakes, grain header and loading means carried at an intermediate point on said bar, a supporting member fitted on the remaining bolster stake of the wagon in line with the first mentioned bolster stake, and means carried by the remaining bolster stake and connected with the free end of the bar to support the same and to swing said bar about its pivotal mounting to vary the height of disposition of the header means from the ground.

2. In a grain header and loader adapted for use with a wagon comprising a body having forward and rear bolster stakes, a bar pivotally mounted on the upper end of said rear bolster stake and having the forward end thereof terminating adjacent the forward bolster stake, grain header and loader carried in the middle portion of said bar, a hand lever mounted pivotally on the forward bolster stake and having an arm extending past the pivot point, a connection from the arm of the hand lever to the forward end of said bar to thus associate these parts in such a way that as the hand lever is moved the bar is swung around its pivotal mounting to raise and lower the header and loader means, and a segmental rack carried by the forward bolster stake to set the hand lever in adjusted positions.

3. In a grain header and loader adapted to use with a wagon comprising a body having forward and rear bolster stakes, a bar pivotally mounted on the upper part of one of said bolster stakes and having the forward end thereof terminating adjacent the remaining bolster stake, grain header and loader means carried in the middle portion of said bar, a hand lever mounted pivotally on said remaining bolster stake and having an arm extending past the pivot point, a connection from the arm of the hand lever to the forward end of the bar to thus associate these parts in such a way that as the hand lever is moved the bar is swung around its pivotal mounting to raise and lower the header and loader means, a segmental rack carried by said remaining bolster stake to set the hand lever in adjusted position, wheels supporting said wagon, a split pulley adapted to be detachably fitted in conjuction with one of said wheels, operating means for said header mechanism, a belt for transmitting power from said split pulley to said operating means, and means operable from said belt for operating said loader means.

4. In a grain header and loader adapted for use with a wagon comprising a body having forward and rear bolster stakes and wheels supporting the same, a bar pivotally mounted on the upper portion of one of said bolster stakes and having the forward end thereof terminating adjacent the remaining bolster stake, grain header and loader means carried by said bar intermediate its ends, a hand lever pivotally mounted on said remaining bolster stake, said hand lever provided with an arm extending beyond the pivot point, a connection from the arm of the hand lever to the forward end of said bar for permitting said bar to be swung upwardly and downwardly, a segmental rack carried by the remaining bolster stake to set the hand lever in adjusted positions, a split pulley adapted to be detachably secured to one of the wheels of said wagon, operating means for the header mechanism, a belt connected to said split pulley and said operating means for driving said operating means, a bracket arm carried from the bar extended to terminate adjacent said belt, operating means for the loader mechanism, and a belt pulley carried by said bracket arm and adapted to contact with said belt for imparting driving power to said loader operating mechanism.

5. In a grain header and loader adapted for use with a wagon comprising a body having forward and rear bolster stakes and wheels supporting the same, a bar pivotally mounted upon one of said bolster stakes and having its forward end terminating adjacent the remaining bolster stake, a grain header and loader means carried by said bar intermediate the ends thereof, a hand lever carried by one of said bolster stakes and engaging the forward end of said bar whereby when said lever is swung, said bar will be raised and lowered, a segmental rack carried adjacent said hand lever and adapted to be engaged thereby for locking said hand lever in a set position, a split pulley detachably secured in engagement with one of the wheels of said wagon, operating means for said header mechanism, a belt for transmitting power movement from said split pulley to said operating means, a bracket arm carried by said bar and terminating adjacent said belt, a belt pulley carried by said bracket arm and adapted to contact with said belt, and a second belt passing around said belt pulley for operating said loader mechanism.

In testimony whereof, I affix my signature in presence of two witnesses.

JOHN W. SULLINS.

Witnesses:
 WILLIE HUDRAN,
 BEN JONES.